(12) United States Patent
    Emswiler

(10) Patent No.: US 9,131,705 B1
(45) Date of Patent: Sep. 15, 2015

(54) KNOCK BOX

(71) Applicant: Charles W. Emswiler, David City, NE (US)

(72) Inventor: Charles W. Emswiler, David City, NE (US)

(*) Notice: Subject to any disclaimer, the term of this patent is extended or adjusted under 35 U.S.C. 154(b) by 0 days.

(21) Appl. No.: 14/225,888

(22) Filed: Mar. 26, 2014

(51) Int. Cl.
    *A22B 5/02* (2006.01)

(52) U.S. Cl.
    CPC .......................................... *A22B 5/02* (2013.01)

(58) Field of Classification Search
    CPC ....... A61D 3/00; A01K 1/0613; A01K 1/031; A22B 5/02; A22B 3/06
    USPC ........ 452/52, 54, 55; 119/751–757, 732, 738, 119/739, 502, 510, 523, 516
    See application file for complete search history.

(56) References Cited

U.S. PATENT DOCUMENTS

| | | | |
|---|---|---|---|
| 3,051,984 A * | 9/1962 | Hlavacek et al. | 452/54 |
| 3,101,508 A | 8/1963 | Murphy et al. | |
| 3,115,670 A * | 12/1963 | Hlavacek et al. | 452/54 |
| 3,143,762 A | 8/1964 | Murphy | |
| 3,324,503 A * | 6/1967 | St Clair | 452/54 |
| 3,703,743 A * | 11/1972 | Schmidt, Jr. | 452/55 |
| 3,724,027 A * | 4/1973 | Zuber | 452/55 |
| 3,760,768 A * | 9/1973 | Patterson | 119/473 |
| 4,716,625 A | 1/1988 | Nijhuis | |
| 4,780,932 A * | 11/1988 | Bowman et al. | 452/54 |
| 5,129,362 A * | 7/1992 | Ferrell | 119/843 |
| 5,645,016 A * | 7/1997 | Mahurin | 119/752 |
| 5,752,472 A * | 5/1998 | Jubinville et al. | 119/728 |
| 6,083,094 A | 7/2000 | Cohen | |
| 6,199,514 B1 * | 3/2001 | Jubinville et al. | 119/728 |
| 6,694,918 B2 | 2/2004 | Draft | |
| 6,945,194 B2 | 9/2005 | Fritsch | |
| 2013/0324023 A1 | 12/2013 | Ralph et al. | |

* cited by examiner

*Primary Examiner* — Richard Price, Jr.
(74) *Attorney, Agent, or Firm* — Dennis L. Thomte; Thomte Patent Law Office LLC

(57) ABSTRACT

A knock box including an inlet end and a discharge end. The knock box includes a vertically movable discharge gate at one side thereof. The knock box also includes a laterally movable squeeze panel or push-out panel which narrows the interior of the box for smaller animals and which may be used to push an animal outwardly through the discharge opening when the discharge gate is in its open position.

9 Claims, 11 Drawing Sheets

KNOCK BOX

BACKGROUND OF THE INVENTION

1. Field of the Invention

This invention relates to a knock or knocking box. More particularly, this invention relates to a knock box wherein animals such as cattle, pigs, sheep or goats are either shot or stunned.

2. Description of the Related Art

Many types of confinement knock or knocking boxes have been previously provided wherein livestock such as cattle, sheep, pigs or goats are confined therein to enable the livestock to be shot or stunned prior to being butchered. First, the prior art knock boxes are very expensive to manufacture. Second, the prior art knock boxes do not satisfactorily stabilize or restrain the animal therein once the animal has entered the knock box. Third, the prior art boxes are not able to accommodate both large animals such as cattle as well as smaller animals such as pigs, etc. Fourth, the prior art knock boxes do not provide a satisfactory means to remove the animal from the knock box after the animal has been shot or stunned therein. Fifth, the prior art knock boxes are difficult to clean after the animal has been ejected therefrom.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A knock box is disclosed for confining an animal therein to enable the animal to be shot or stunned. The invention includes a generally rectangular support floor or support structure having a first end, a second end, a first side, a second side, and an inclined upper surface which extends downwardly from the first side of the support floor to the second side of the support floor. Preferably, the support floor structure is comprised of concrete.

An upstanding first support post has its lower end bolted to the support floor at the first side of the support floor at the first end of the support floor. An upstanding second support post has its lower end bolted to the support floor at the second side of the support floor at the first end of the support floor. A first horizontally disposed beam is secured to the first and second support posts and extends therebetween at the upper ends of the first and second support posts. A second horizontally disposed beam is secured to the first and second support posts and extends therebetween adjacent the lower ends of the first and second support posts. A third horizontally disposed beam is secured to the first and second support posts between the first and second beams and extends between the first and second support posts. A plurality of vertically disposed and horizontally spaced bars or rails are secured to the second and third beams and extend therebetween. An upstanding third support post has its lower end secured to the support floor at the second end of the support floor at the first side of the support floor. An upstanding fourth support post has its lower end bolted to the support floor at the second side of the support floor at the second end of the support floor. A horizontally extending beam is secured to and extends between the upper ends of the third and fourth support posts.

The third and fourth support posts define an open inlet end. A vertically disposed inlet gate extends between the third and fourth support posts. The inlet gate is selectively vertically movable between open and closed positions. The inlet gate, when in its closed position, closes the open inlet end of the box. When the inlet gate is in the open position, an animal may enter the box. A vertically disposed and generally horizontally movable squeeze panel is movably positioned between the first and third support posts. The squeeze panel is horizontally movable between a first outer position relative to the first and third support posts and a second inner position relative to the first and third support posts. The squeeze panel enables the knock box to accommodate large and small animals. The squeeze panel also helps to stabilize the animal within the box. A vertically disposed and vertically movable discharge gate is movably positioned between the second and fourth support posts. The discharge gate is selectively movable between a lower closed position and an upper open upper position.

The squeeze panel not only enables the box to accommodate large and small animals but provides a push-out mechanism to push the killed animal from the box after the vertically disposed gate which extends between the second and fourth gates has been moved to its upper open position.

It is therefore a principal object of the invention to provide an improved knock or knocking box.

A further object of the invention is to provide a knock box which has means associated therewith to restrain the animal in the box.

A further object of the invention is to provide a knock box which has an inclined support floor which is inclined towards the discharge gate thereof.

A further object of the invention is to provide a knock box which is relatively inexpensive to manufacture.

A further object of the invention is to provide a knock box which is convenient to operate.

Yet another object of the invention is to provide a knock box which includes means to eject the killed animal from the box.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
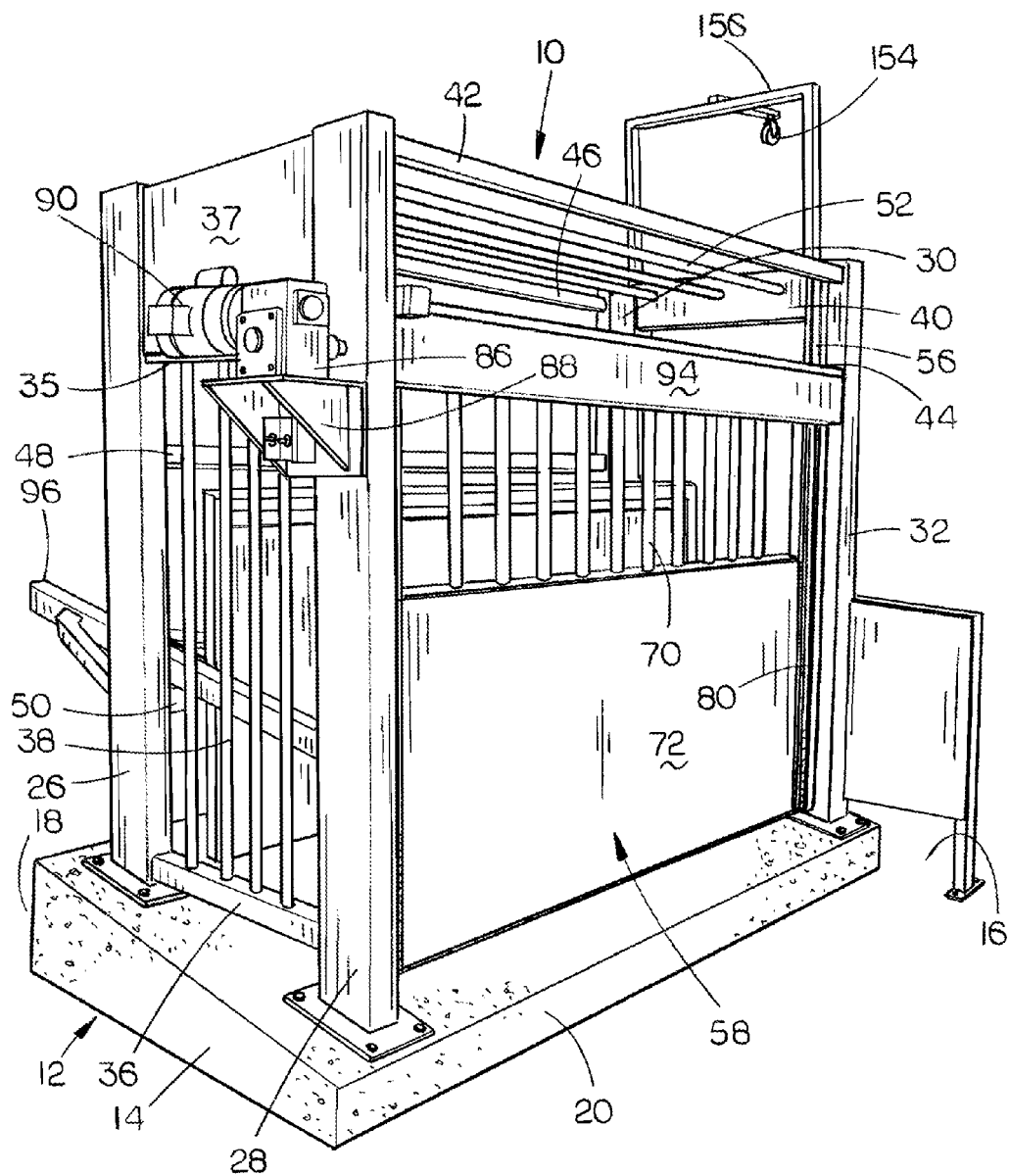
FIG. 1 is a perspective view of the knock box of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The knock or knocking box of this invention is referred to generally by the reference numeral 10. Box 10 includes a generally rectangular support structure 12 which is preferably constructed of concrete. Support structure 12 includes a first end 14, a second end 16, a first side 18 and a second side 20. Support structure 12 has an inclined floor 22 which is inclined downwardly from the first side 18 of the support structure 12 to the second side 20 of the support structure 12. Preferably, a ramp or step is provided at end 16 of support structure 12.

A first vertically disposed post 26 has its lower end bolted to support structure 12 adjacent the first end 14 of the support structure 12 and the first side 18 of the support structure 12. A second vertically disposed support post 28 has its lower end bolted to support structure 12 adjacent the first end 14 of the support structure 12 and the second side 20 of the support structure 12. A third vertically disposed support post 30 has its lower end bolted to support structure 12 adjacent the second end 16 of the support structure 12 and the first side 18 of the support structure 12. A fourth support post 32 has its lower end bolted to support structure 12 adjacent the second end 16 of support structure and the second side 20 of the support structure 12.

A horizontally disposed beam 34 is secured to support posts 26 and 28 at the upper ends thereof and extends therebetween. A horizontally disposed beam 35 is secured to support posts 26 and 28 and extends therebetween below beam 34. A horizontally disposed beam 36 is secured to support posts 26 and 28 and extends therebetween adjacent the lower ends thereof. A plurality of vertically disposed and horizontally spaced-apart bars or rails 38 are secured to beams 35 and 36 and extend therebetween. A flat shield 37 is secured to the upper ends of support posts 26 and 28 and extends therebetween.

A horizontally disposed beam 40 is secured to support posts 30 and 32 and extends therebetween at the upper ends of support posts 30 and 32. A horizontally disposed beam 42 is secured to and extends between support posts 28 and 32 adjacent the upper ends thereof. A horizontally disposed beam 44 is secured to support posts 28 and 32 and extends therebetween below beam 42. A horizontally disposed beam 46 is secured to and extends between the upper ends of support posts 26 and 30. A horizontally disposed beam 48 is secured to support posts 26 and 30 and extends therebetween below beam 46. A horizontally disposed beam 50 is secured to support posts 26 and 30 and extends therebetween below beam 48. A plurality of horizontally disposed bars, rails or pipes 52 are secured to beams 34 and 40 and extend therebetween in a spaced-apart manner.

Figure 2:
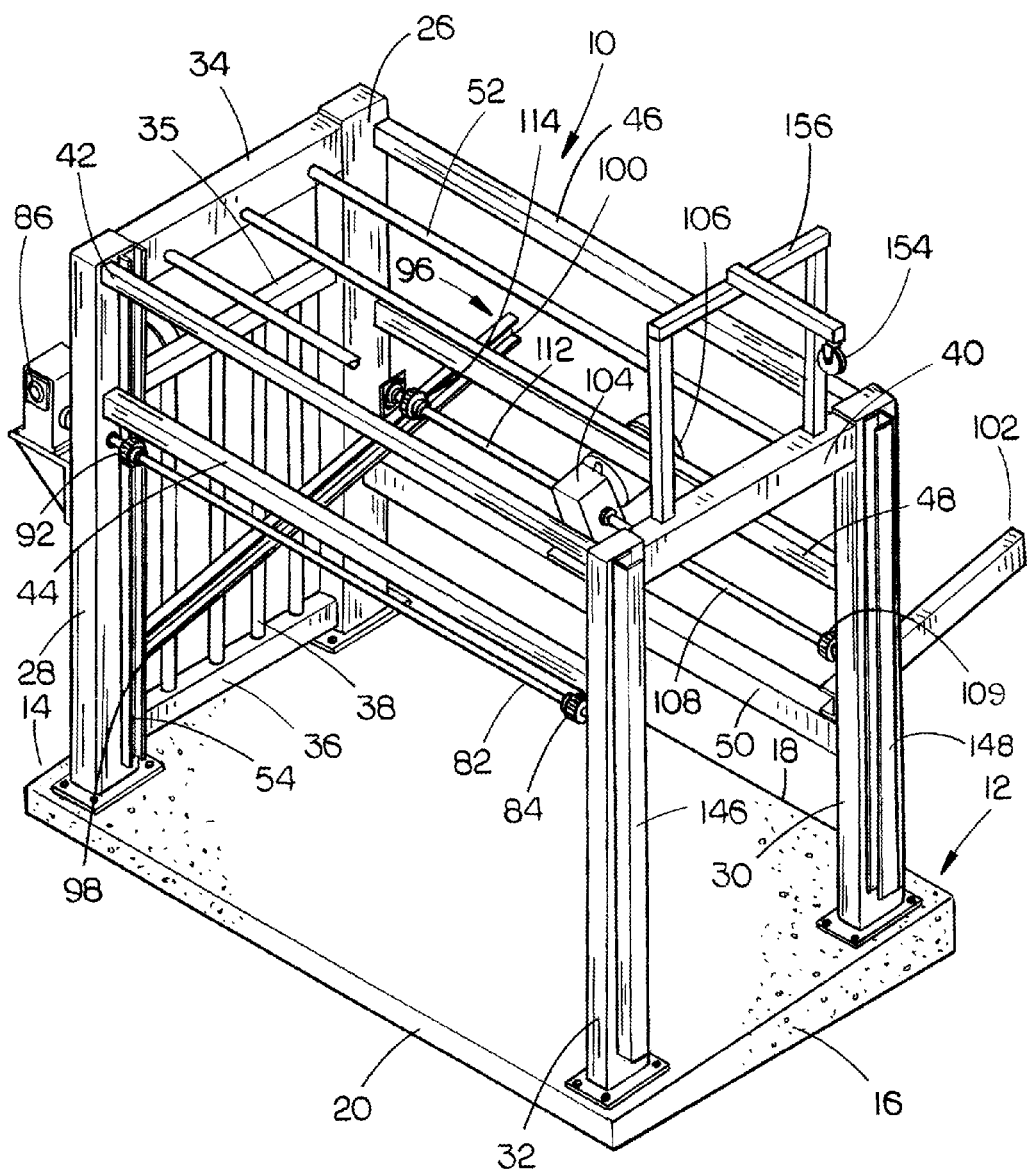
FIG. 2 is a partial perspective view of the knock box of this invention with certain structure removed therefrom to more fully illustrate the invention.
Figure 3:
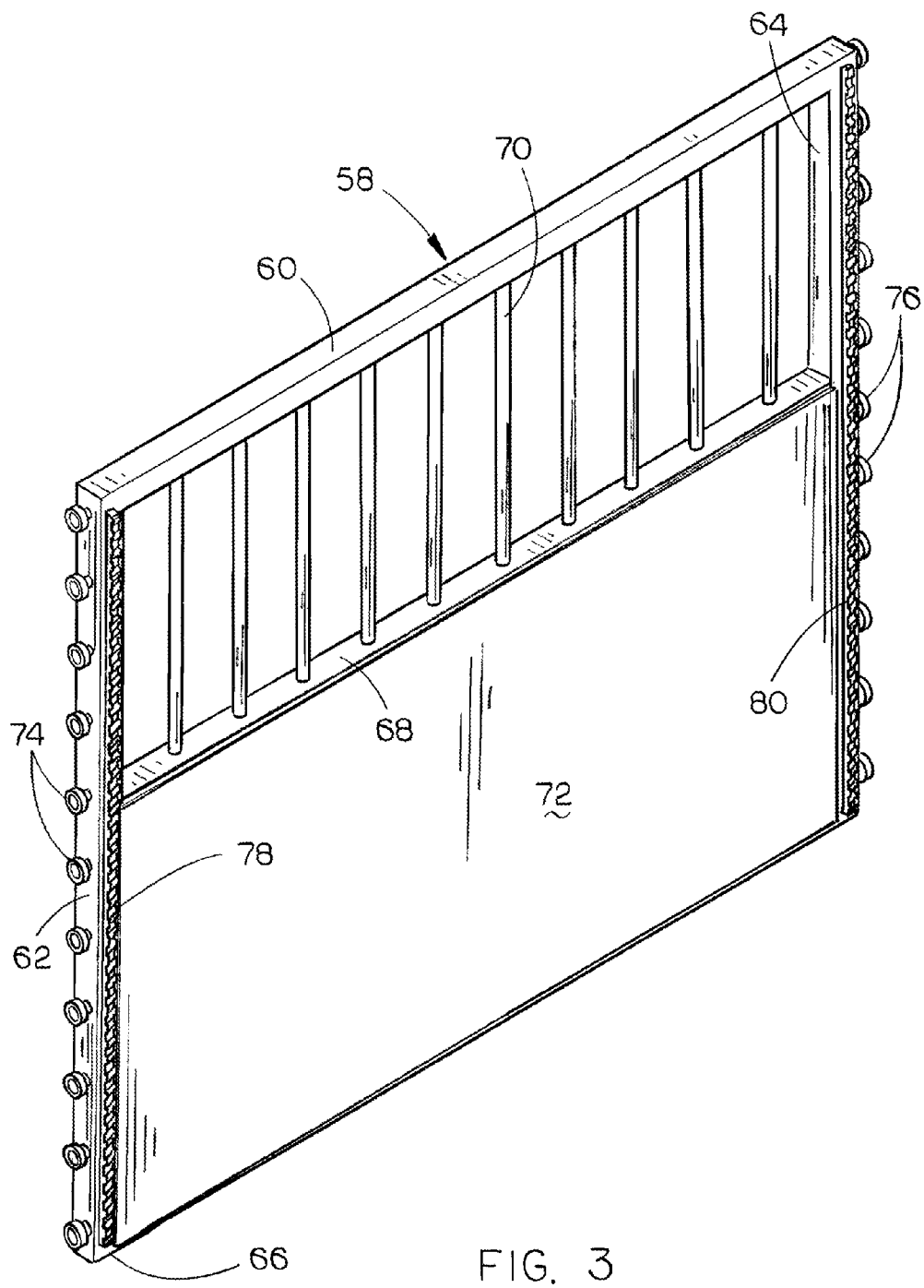
FIG. 3 is a perspective view of the discharge gate of the invention.
Figure 4:
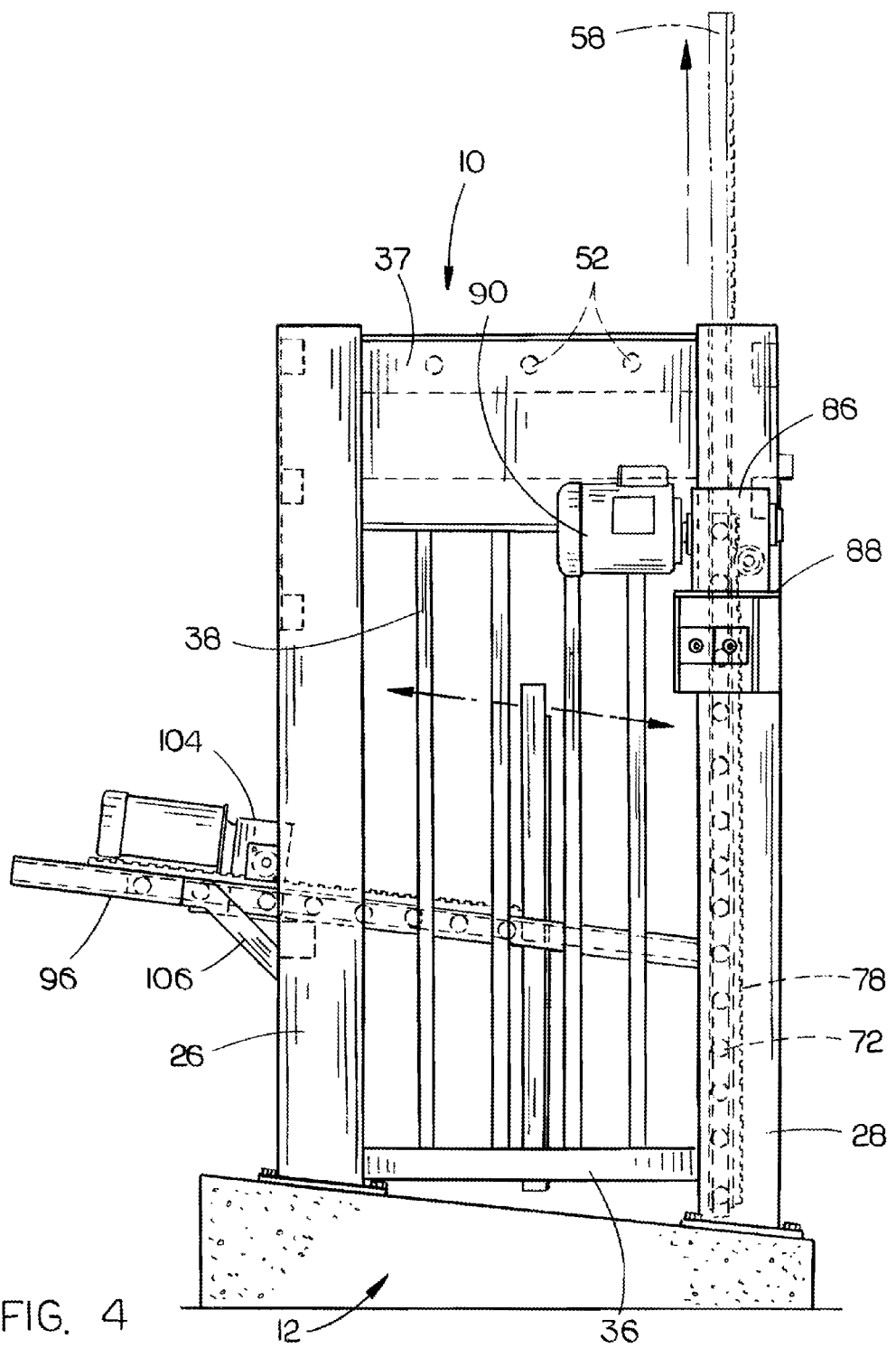
FIG. 4 is an end elevational view of the knock box of this invention.
Figure 5:
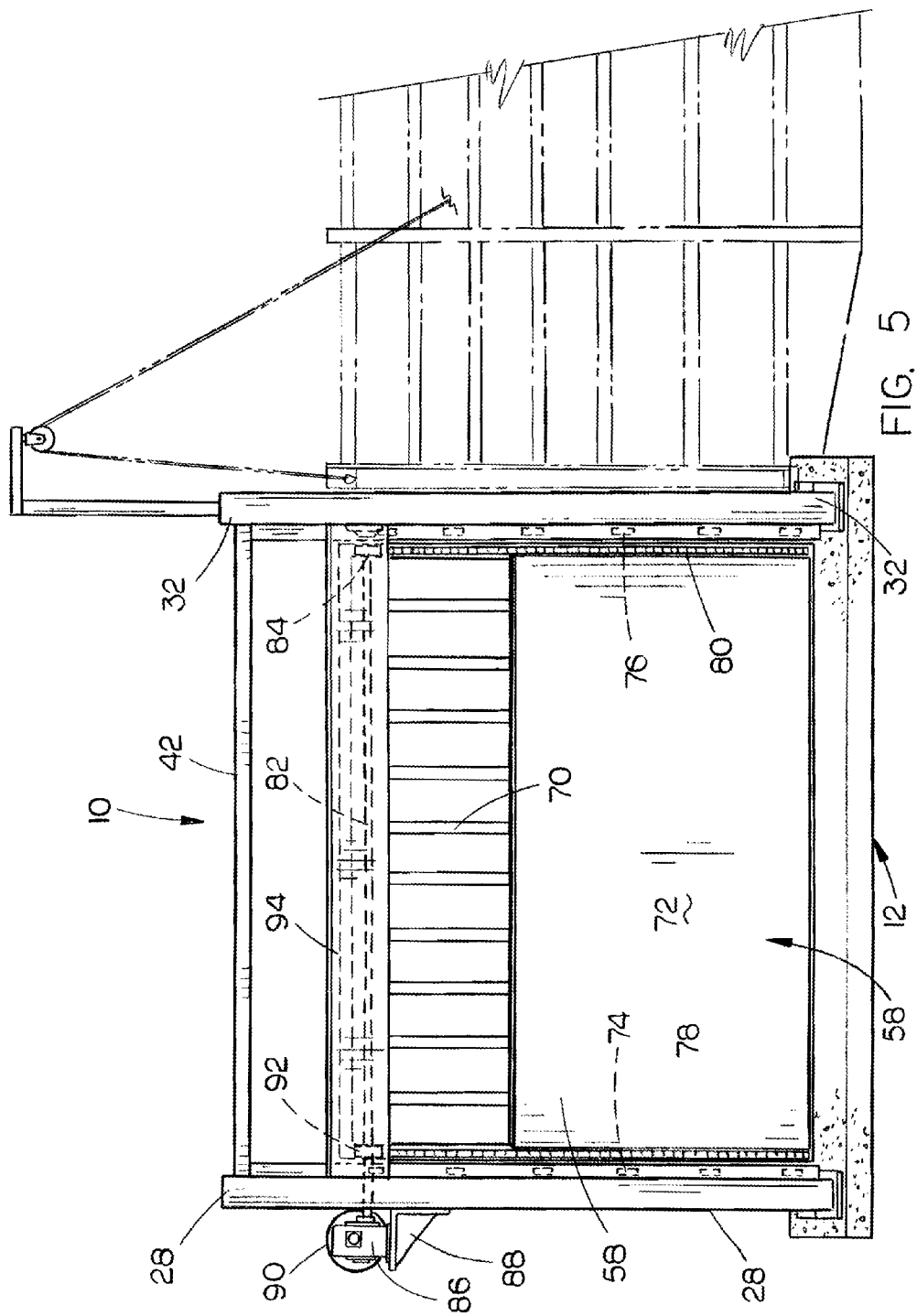
FIG. 5 is a side elevational view of the knock box of this invention.
Figure 6:
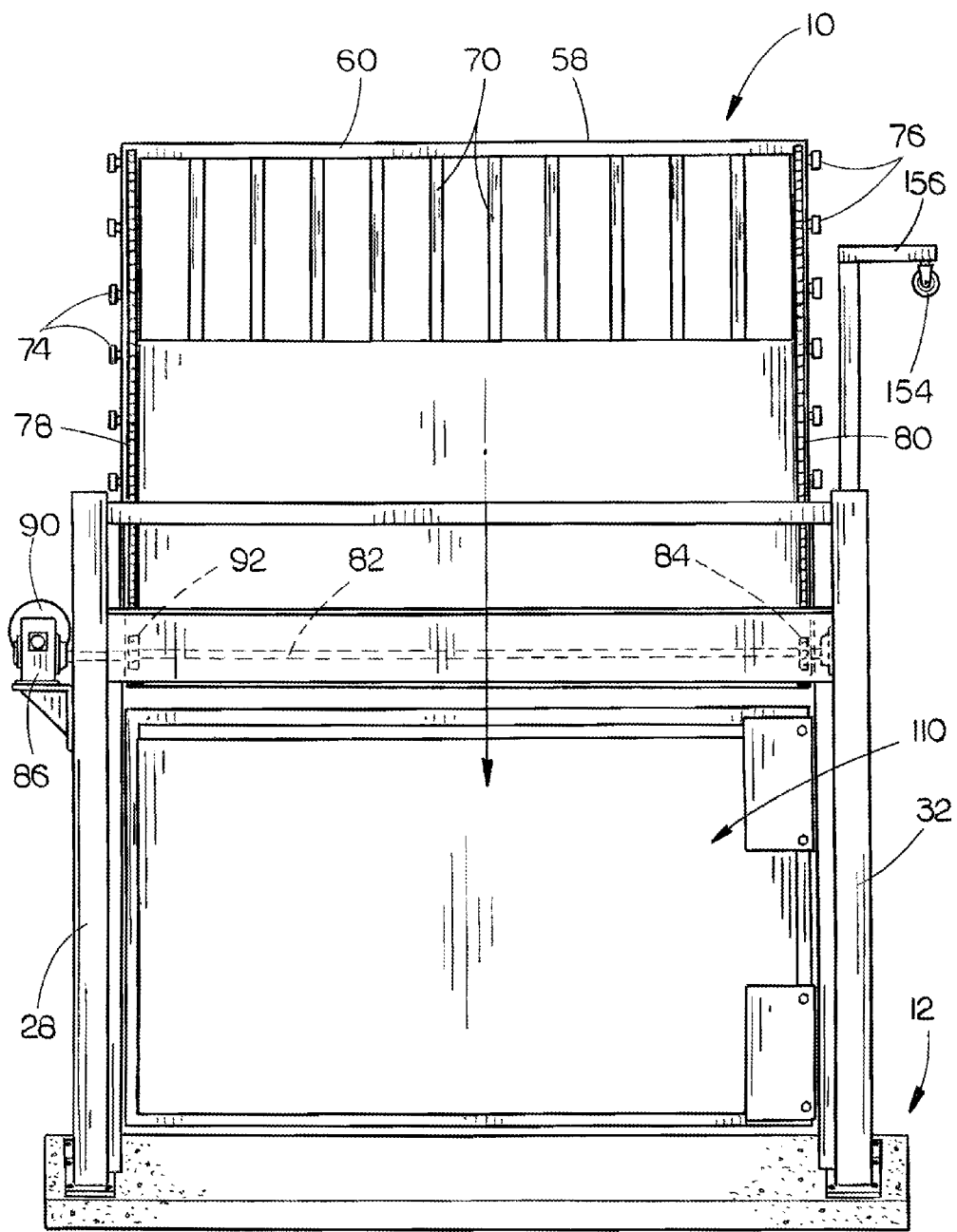
FIG. 6 is a side elevational view of the knock box of this invention with the discharge gate in its raised or open position.

A vertically disposed channel member 54 is secured to support post 28 at the inner side thereof as seen in FIG. 2. A vertically disposed channel member 56 is secured to support post 32 at the inner side thereof as seen in FIG. 1. Channel members 54 and 56 are configured to vertically movably support discharge gate 58 therein as will now be described. Gate 58 includes an elongated and horizontally disposed upper frame member 60, a first side frame member 62, a second side frame member 64, a lower frame member 66 and an intermediate frame member 68 which extends between frame members 62 and 64 as seen in FIG. 3. A plurality of vertically disposed and horizontally spaced-apart bars 70 are secured to frame members 60 and 68 and extend therebetween (FIG. 3). A panel member 72 is secured to frame members 62 and 64 below frame member 68 and extends therebetween, as also seen in FIG. 3. The lower end of panel member 72 is secured to frame member 66 by welding. Panel member 72 is also welded to side frame members 62 and 64 as well as to frame member 68. A plurality of rollers 74 are secured to the outer side of frame member 62 in a spaced-apart manner so as to extend outwardly from frame member 62 (FIG. 3). A plurality of rollers 76 are secured to the outer side of frame member 64 in a spaced-apart manner so as to extend outwardly from frame member 64 (FIG. 3). The rollers 74 are vertically movably received by channel member 54 on support post 28 and the rollers 76 are vertically movably received by channel member 56 on support post 32. Gate 58 is selectively vertically movable between the closed position of FIG. 1 to the open position of FIG. 6 as will be described in more detail hereinafter. An elongated toothed gear rack 78 is secured to the outer side of frame member 62 and an elongated toothed gear rack 80 is secured to the outer side of frame member 64.

The numeral 82 refers to an elongated drive shaft which is positioned below beam 44 as seen in FIG. 1. One end of shaft 82 is rotatably secured to support post 32 and has a sprocket 84 secured to shaft 82 for rotation with shaft 82 at the inner side of support post 32. The other end of shaft 82 rotatably extends through support post 28 and is connected to a gear box 86 which is mounted on a support 88 which is secured to support post 28 as seen in FIG. 1. Gear box 86 is driven by a reversible electric motor 90. A sprocket 92 is mounted on shaft 82 for rotation therewith. Sprocket 84 is in mesh with the teeth of gear rack 80 on gate 58 and sprocket 92 is in mesh with the teeth of gear racks 78 on gate 58. Thus, rotation of shaft 82 in a first direction will cause gate 58 to be moved upwardly with respect to support posts 28 and 32. Rotation of shaft 82 in an opposite direction will cause gate 58 to be moved downwardly with respect to support posts 28 and 32. A safety shield 94 is secured to beam 44 and extends between support posts 28 and 32 to prevent a person from coming into contact with the shaft 82, sprocket 84 and sprocket 92.

The numeral 96 refers to an elongated and inclined channel member having an inner end 98 and an outer end 100. The inner end of channel member 96 is secured to support post 28 by welding. Channel member 96 is also supported by beam 50 or support post 26 so that the outer end 100 of channel member 96 is positioned outwardly of beam 48. The numeral 102 refers to an inclined channel member which is secured to support post 30 so as to extend upwardly and outwardly therefrom. Channel member 102 dwells in the same plane as channel member 96.

The numeral 104 refers to a gear box which is mounted on a support brace 106 which is secured to beam 50 between the ends thereof. Gear box 104 is driven by a reversible electric motor 106. Shaft 108 extends from gear box 104 towards support post 30 and has a sprocket 109 mounted on the end thereof for rotation therewith which is positioned adjacent channel member 102. Shaft 112 extends from gear box 104 towards support post 26. A sprocket 114 is mounted on shaft 112 for rotation therewith adjacent channel member 96. The outer ends of shafts 108 and 112 are suitably mounted in bearings.

Figure 7:
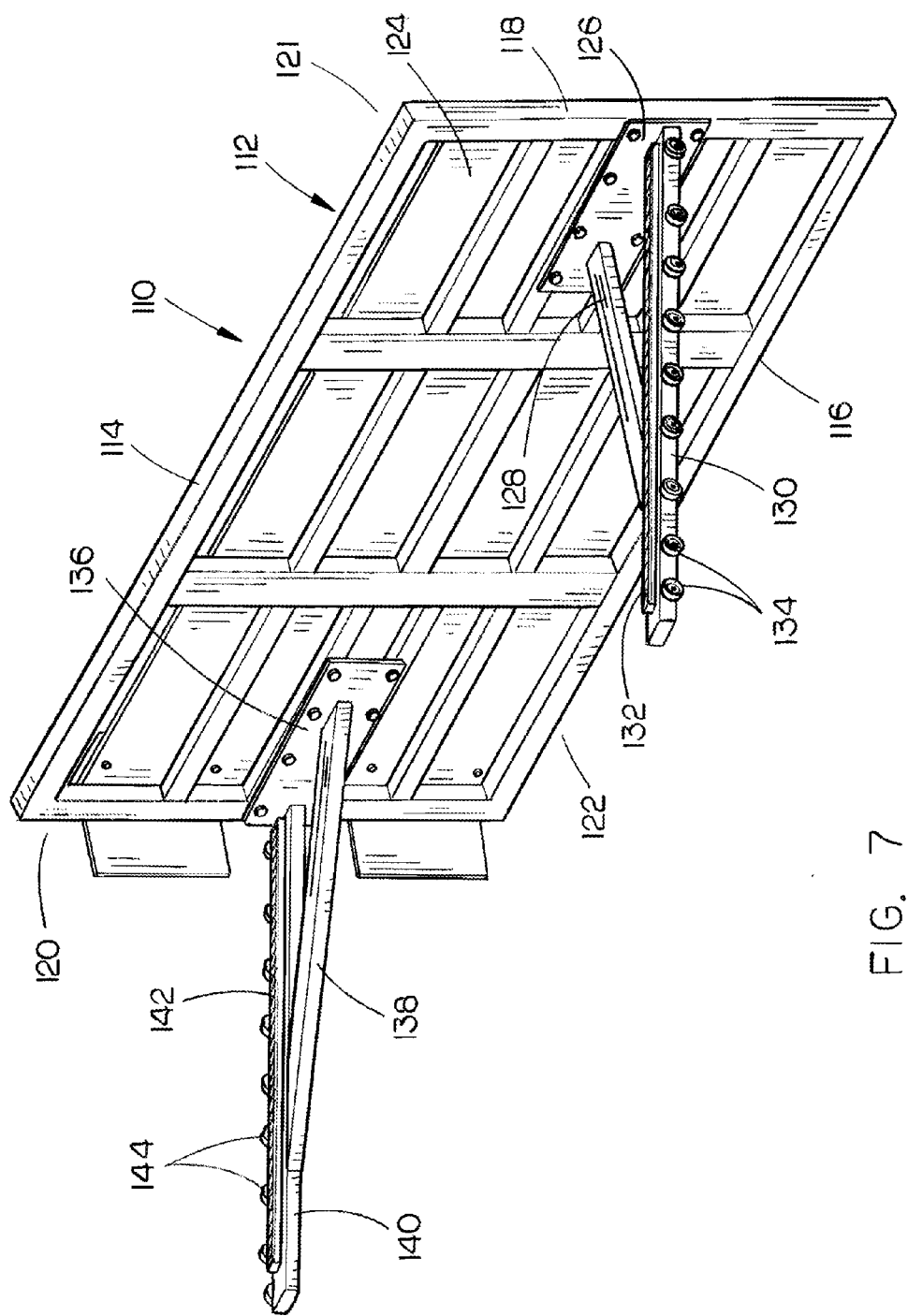
FIG. 7 is a perspective view of the squeeze panel portion of the invention.
Figure 8:
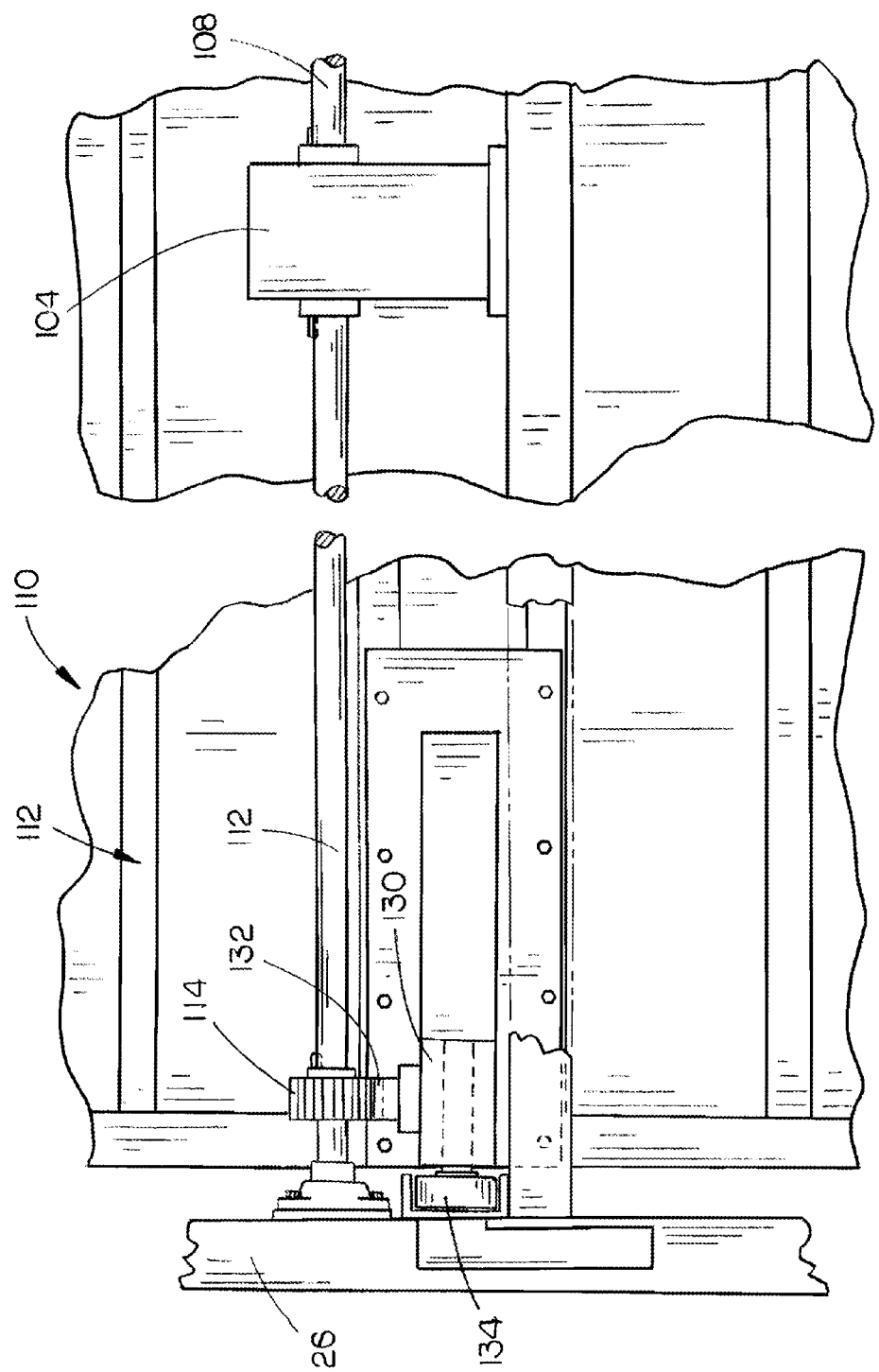
FIG. 8 is a partial side view of the knock box of this invention which illustrates the manner in which the squeeze panel is moved.

The numeral 110 refers to a combination squeeze plate and carcass push-out assembly. Assembly 110 includes a vertically disposed framework 112 having an upper end 114, lower end 116, first side 118, second side 120, a front side 121 and a back side 122. A panel 124 is secured to the front side 121 of framework 112. Plate 126 is secured to the back side 122 of framework 112 by bolts, welding, etc., adjacent side 118 between the upper and lower ends of framework 112 as seen in FIG. 7. Support brace 128 is secured to the back side of plate 126 and extends outwardly therefrom. A support member 130 has its forward end secured to plate 126 and extends upwardly and outwardly therefrom. The outer end of brace 128 is secured to support member 130. An elongated toothed gear rack 132 is secured to the upper surface of support member 130. A plurality of spaced-apart rollers 134 extend from the side of support member 130 as seen in FIG. 7.

Plate 136 is secured to the back side 122 of framework 112 by bolts, welding, etc., adjacent side 120 between the upper and lower ends of framework 112 as seen in FIG. 7. Support brace 138 is secured to the back side of plate 136 and extends outwardly therefrom. A support member 140 has its forward end secured to plate 136 and extends upwardly and outwardly therefrom. The outer end of brace 138 is secured to support member 138. An elongated toothed gear rack 142 is secured to the upper surface of support member 140. A plurality of spaced-apart rollers 144 extend from the side of support member 140 as seen in FIG. 7.

As seen in FIG. 2, support post 32 has an elongated and vertically disposed channel member 146 secured thereto. As also seen in FIG. 2, support post 30 has an elongated and vertically disposed channel member 148 secured thereto. Channel members 146 and 148 are configured to have a vertically movable entrance gate 150 vertically slidably movable therein. Gate 150 is selectively movable between a closed position and an open position. A rope or cable 152 is secured to the upper end of gate 150 and extends upwardly therefrom over a pully 154 mounted on a support structure 156 which extends upwardly from beam 40. In some cases, the gate 150 is not needed if the entrance end of the box 10 is located closely to an entrance door or the like. However, the use of gate 150 is preferred.

Figure 9:
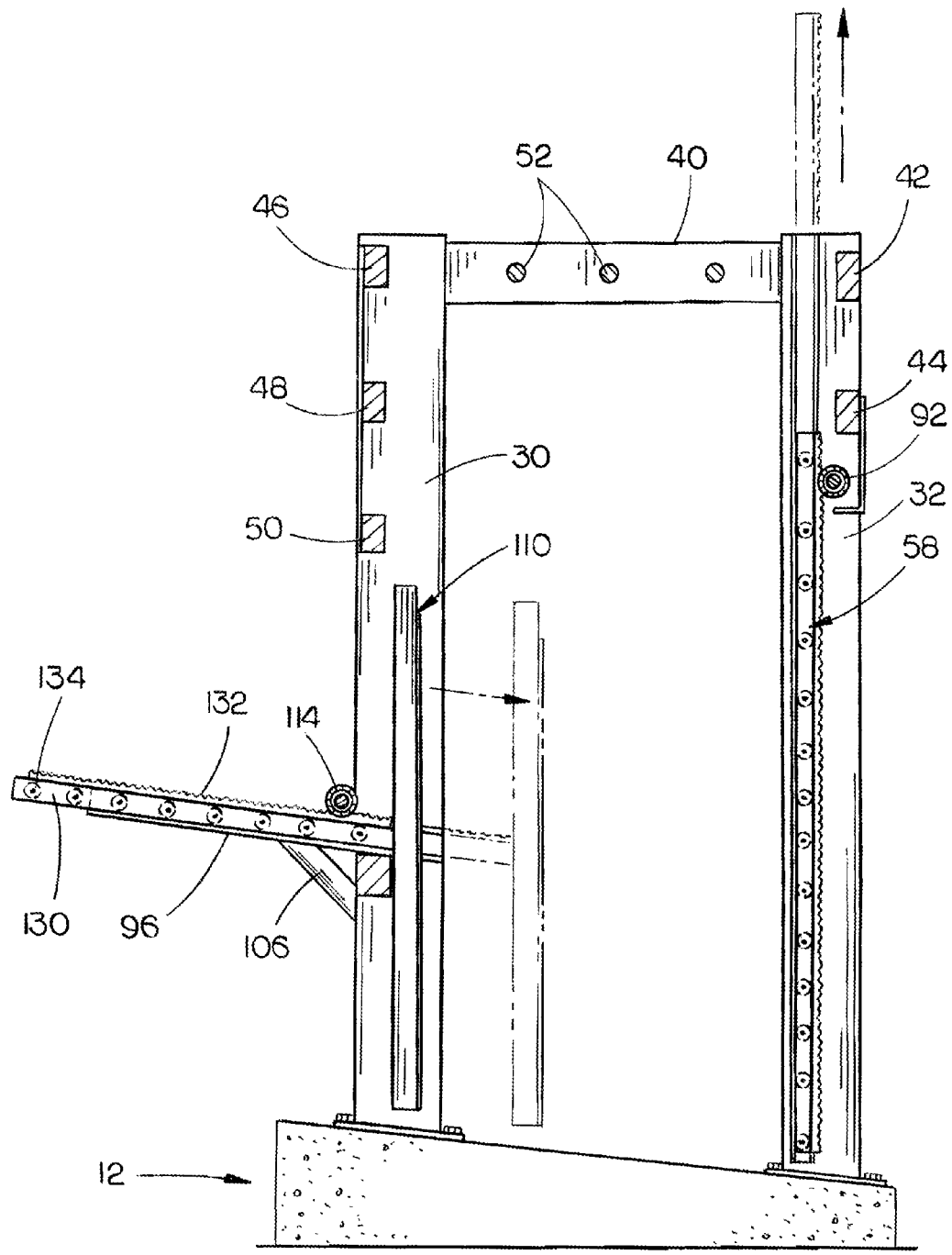
FIG. 9 is a partial sectional view of the knock box of this invention which illustrates the manner in which the squeeze panel may be moved from an outer position to an inner position.

The operation of the box 10 will now be described. Initially, the discharge gate 58 and the inlet gate 150 will be in their closed positions. The squeeze panel 110 will normally be in its outer position, as illustrated by solid lines in FIG. 9. If the animal to be processed is a large animal, the squeeze panel 110 will temporarily be left in the position of FIG. 9. If the animal is a smaller animal such as a pig, etc., the squeeze panel 110 may be positioned in the dashed line position of FIG. 9 to create a more narrow alleyway for the animal. The inlet gate 150, if not already in the raised position, will be raised to open the inlet end of the box. The animal will then be moved into the interior of the box 10 at which time the inlet gate 150 will be closed. If it is desired to limit the side-to-side movement of the animal, the squeeze gate 58 may be moved inwardly towards the animal.

Figure 10:
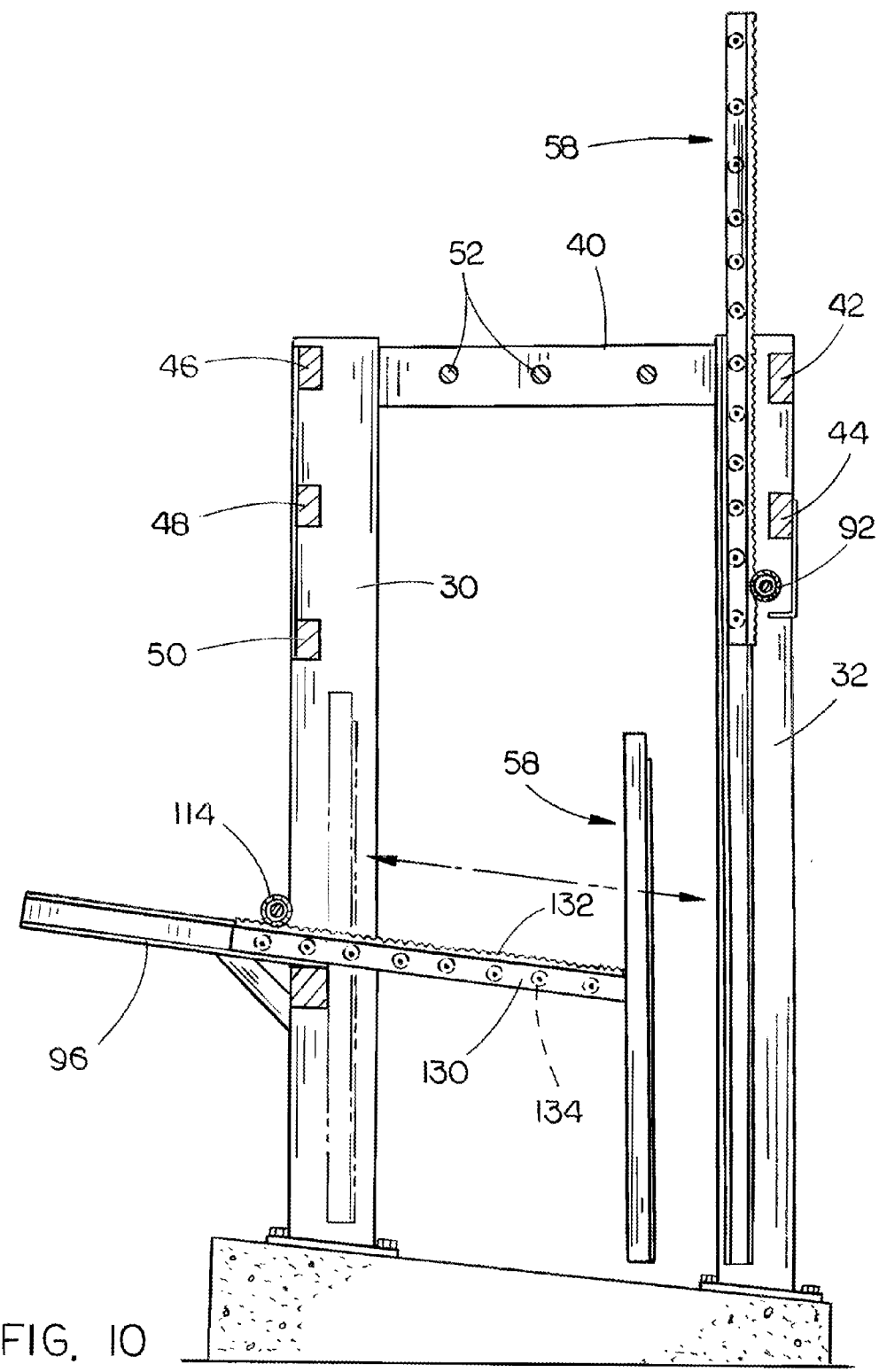
FIG. 10 is a view similar to FIG. 9 except that the squeeze panel has been moved further inwardly with respect to the knock box.
Figure 11:
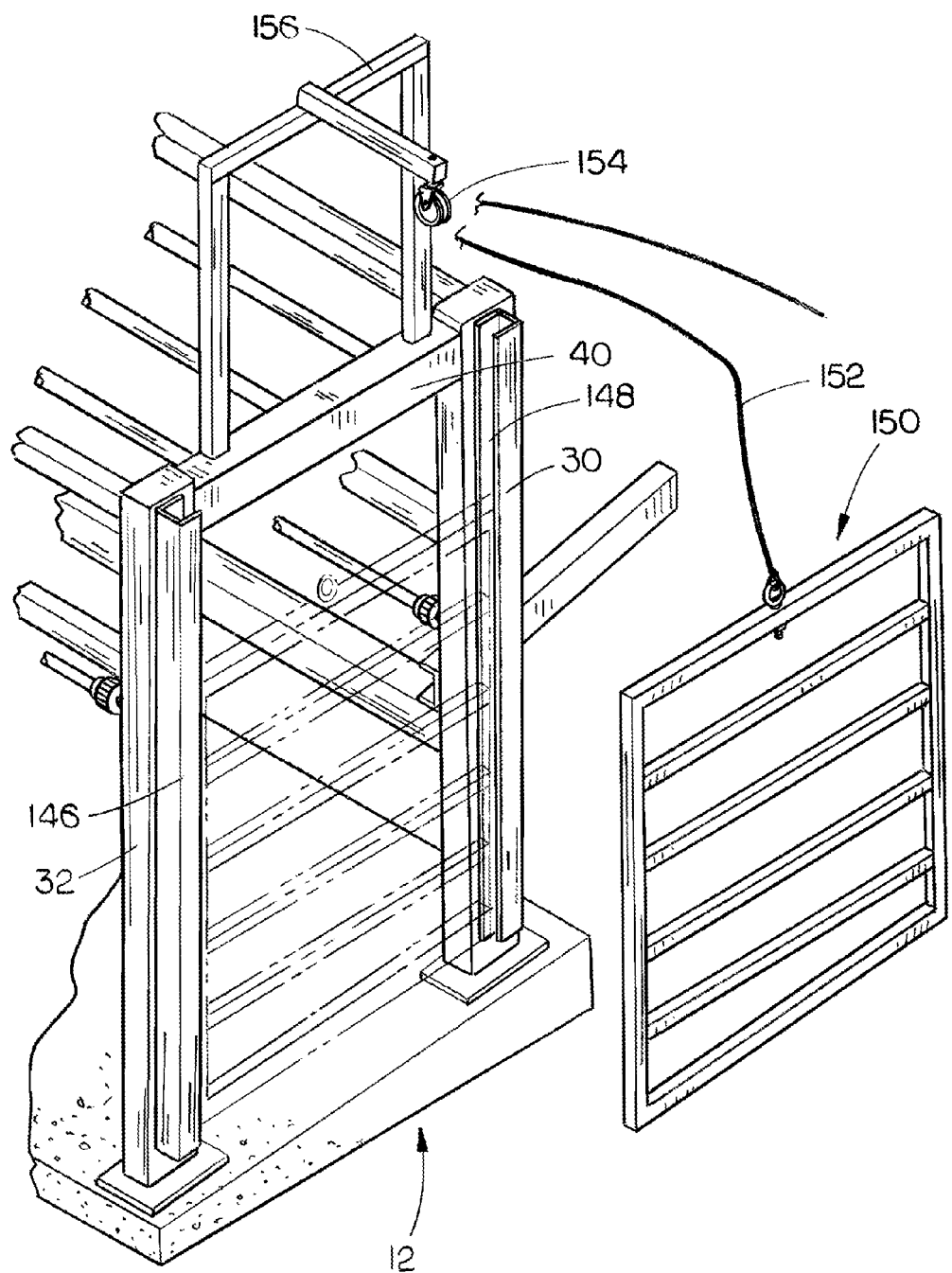
FIG. 11 is a partial perspective view illustrating the inlet gate of the invention.

At that time, the animal will be shot or stunned in conventional fashion. The discharge gate 58 is then raised so that the animal falls outwardly from the box 10. The discharge of the animal from the box 10 is encouraged by the sloped floor of the box 10. If the animal does not fall out of the interior of the box 10, the squeeze panel 58 will be moved to the solid line position of FIG. 10 to push the animal from the box 10. The animal is then processed in conventional fashion.

The box 10 is extremely durable, easy to use, easy to clean and safe to use.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A knock box, comprising:

a generally rectangular support floor having a first end, a second end, a first side and a second side;

an upstanding first support post having upper and lower ends;

said lower end of said first support post being secured to said support floor at said first side adjacent said first end thereof;

an upstanding second support post having upper and lower ends;

said lower end of said second support post being secured to said support floor at said second side adjacent said first end thereof;

a first horizontally disposed beam secured to said first and second support posts at said upper ends thereof which extends therebetween;

a second horizontally disposed beam secured to said first and second support posts below said first beam which extends between said first and second support posts;

a plurality of horizontally spaced-apart and vertically extending bars secured to and extending between said first and second beams;

an upstanding third support post having upper and lower ends;

said lower end of said third support post being secured to said support floor at said first side adjacent said second end thereof;

an upstanding fourth support post having upper and lower ends;

said lower end of said fourth support post being secured to said support floor at said second side adjacent said second end thereof;

a third horizontally disposed beam secured to said upper ends of said third and fourth support posts which extends therebetween;

said third and fourth support posts defining an open inlet end;

a vertically disposed inlet gate extending between said third and fourth support posts;

said inlet gate being selectively vertically movable between open and closed positions;

said inlet gate, when in said closed position, closing said
open inlet end;
a vertically disposed and generally horizontally movable
squeeze panel movably positioned between said first and
third support posts;
said squeeze panel being horizontally movable between a
first outer position relative to said first and third support
posts and a second inner position relative to said first and
third support posts;
a vertically disposed and vertically movable discharge gate
movably positioned between said second and fourth
support posts;
said discharge gate being selectively movable between a
lower closed position and an upper open position.

2. The knock box of claim 1 wherein said support floor is inclined so as to extend downwardly from said first side to said second side thereof.

3. The knock box of claim 1 wherein said discharge gate is moved between said lower and upper positions by means of an electrically driven gear box.

4. The knock box of claim 1 wherein said squeeze panel is moved between said outer and inner positions by an electrically driven gear box.

5. A knock box, comprising:
a generally rectangular support floor having a first end, a
second end, a first side and a second side;
an upstanding first support post having upper and lower
ends;
said lower end of said first support post being secured to
said support floor at said first side adjacent said first end
thereof;
an upstanding second support post having upper and lower
ends;
said lower end of said second support post being secured to
said support floor at said second side adjacent said first
end thereof;
a first horizontally disposed beam secured to said first and
second support posts at said upper ends thereof which
extends therebetween;
a second horizontally disposed beam secured to said first
and second support posts below said first beam which
extends between said first and second support posts;
a plurality of horizontally spaced-apart and vertically
extending bars secured to and extending between said
first and second beams;
an upstanding third support post having upper and lower
ends;
said lower end of said third support post being secured to
said support floor at said first side adjacent said second
end thereof;
an upstanding fourth support post having upper and lower
ends;
said lower end of said fourth support post being secured to
said support floor at said second side adjacent said second end thereof;
a third horizontally disposed beam secured to said upper
ends of said third and fourth support posts which extends
therebetween;
said third and fourth support posts defining an open inlet
end;
a vertically disposed and generally horizontally movable
squeeze panel movably positioned between said first and
third support posts;
said squeeze panel being horizontally movable between a
first outer position relative to said first and third support
posts and a second inner position relative to said first and
third support posts;
a vertically disposed and vertically movable discharge gate
movably positioned between said second and fourth
support posts;
said discharge gate being selectively movable between a
lower closed position and an upper open position.

6. The knock box of claim 5 wherein said support floor is inclined so as to extend downwardly from said first side to said second side thereof.

7. The knock box of claim 5 wherein said discharge gate is moved between said lower and upper positions by means of an electrically driven gear box.

8. The knock box of claim 5 wherein said squeeze panel is moved between said outer and inner positions by an electrically driven gear box.

9. A knock box, comprising:
a generally rectangular support floor having a first end, a
second end, a first side and a second side;
an upstanding first support post having upper and lower
ends;
said lower end of said first support post being secured to
said support floor at said first side adjacent said first end
thereof;
an upstanding second support post having upper and lower
ends;
said lower end of said second support post being secured to
said support floor at said second side adjacent said first
end thereof;
a first horizontally disposed beam secured to said first and
second support posts at said upper ends thereof which
extends therebetween;
a second horizontally disposed beam secured to said first
and second support posts below said first beam which
extends between said first and second support posts;
a plurality of horizontally spaced-apart and vertically
extending bars secured to and extending between said
first and second beams;
an upstanding third support post having upper and lower
ends;
said lower end of said third support post being secured to
said support floor at said first side adjacent said second
end thereof;
an upstanding fourth support post having upper and lower
ends;
said lower end of said fourth support post being secured to
said support floor at said second side adjacent said second end thereof;
a third horizontally disposed beam secured to said upper
ends of said third and fourth support posts which extends
therebetween;
said third and fourth support posts defining an open inlet
end;
said second and fourth support posts having inner sides;
an elongated and vertically disposed first channel member,
having upper and lower ends, secured to said inner side
of said second support post;
an elongated and vertically disposed second channel member, having upper and lower ends, secured to said inner
side of said fourth support post;
a vertically disposed discharge gate having an upper end, a
lower end, a first side and a second side;
said discharge gate having inner and outer sides;
said first and second sides of said discharge gate being
vertically movably mounted in said first and second
channel members respectively;
said discharge gate being movable between an upper open
position and a closed lower position;

said first side of said discharge gate having a vertically disposed and elongated toothed first gear rack secured to the inner side thereof;

said second side of said discharge gate having a vertically disposed and elongated toothed second gear rack secured to the inner side thereof;

a horizontally disposed and elongated first drive shaft having first and second ends;

said first end of said first drive shaft rotatably extending through said second support post;

said second end of said first drive shaft rotatably secured to said fourth support post;

a first sprocket secured to said first drive shaft for rotation therewith which meshes with said toothed first gear rack;

a second sprocket secured to said first drive shaft for rotation therewith which meshes with said toothed second gear rack;

a reversible first electric motor operatively coupled to said first end of said first drive shaft for rotating said first drive shaft in first and second directions;

said discharge gate being moved upwardly with respect to said second and fourth support posts when said first drive shaft is rotated in said first direction;

said discharge gate being moved downwardly with respect to said second and fourth support posts when said first drive shaft is rotated in said second direction;

a third elongated channel member having inner and outer ends;

said third channel member being operatively secured to said first and second support posts whereby said outer end of said third channel member is spaced outwardly of the box;

a fourth elongated channel member having inner and outer ends;

said fourth elongated channel member having its said inner end operatively secured to said third support post so that said outer end of said fourth channel member is spaced outwardly of the box;

an upstanding squeeze panel having an upper end, a lower end, a first end, a second end, an inner side and an outer side;

an elongated first support member having inner and outer ends;

said inner end of said first support member being secured to said outer side of said squeeze panel so that said first support member extends outwardly therefrom;

said first support member having a plurality of spaced-apart rollers secured thereto which are configured to be rotatably received by said third channel member;

said first support member having a third elongated toothed gear rack secured thereto;

an elongated second support member having inner and outer ends;

said inner end of said second support member being secured to said outer side of said squeeze panel so that said second support member extends outwardly therefrom;

said second support member having a plurality of spaced-apart rollers secured thereto which are configured to be rotatably received by said fourth channel member;

said second support member having a fourth elongated toothed gear rack secured thereto;

a horizontally disposed and elongated second drive shaft having first and second ends;

said first end of said second drive shaft being rotatably secured to said first support post;

said second end of said second drive shaft rotatably secured to said third support post;

a third sprocket secured to said second drive shaft for rotation therewith which meshes with said third gear rack;

a fourth sprocket secured to said second drive shaft for rotation therewith which meshes with said fourth gear rack;

a reversible motor operatively coupled to said second drive shaft for rotating said second drive shaft in first and second directions;

said squeeze panel being movable towards said discharge gate when said second drive shaft is rotated in said first direction;

said squeeze panel being movable away from said discharge gate when said second drive shaft is rotated in said second direction.

* * * * *